(12) United States Patent
Kiani (10) Patent No.: US 6,511,229 B2
(45) Date of Patent: Jan. 28, 2003

(54) METHODS AND APPARATUS FOR CONTROLLING ACCESS TO AN OPTICAL INTERFACE

(75) Inventor: Sepehr Kiani, Watertown, MA (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/747,584

(22) Filed: Dec. 21, 2000

(65) Prior Publication Data

US 2002/0150342 A1 Oct. 17, 2002

(51) Int. Cl.[7] ................................................ G02B 6/36
(52) U.S. Cl. ......................................... 385/53; 439/137
(58) Field of Search ........................... 385/53, 135, 92; 439/137, 145

(56) References Cited

U.S. PATENT DOCUMENTS

| | | | | |
|---|---|---|---|---|
| 3,209,301 A | * | 9/1965 | Duffy, Jr. ..................... | 439/137 |
| 4,277,135 A | * | 7/1981 | Schrott et al. ................ | 385/59 |
| 5,348,487 A | * | 9/1994 | Marazzi et al. ............... | 385/78 |
| 5,379,362 A | * | 1/1995 | Kawamura .................... | 385/77 |
| 5,845,036 A | * | 12/1998 | De Marchi .................... | 385/139 |
| 5,940,560 A | * | 8/1999 | De Marchi et al. ........... | 385/58 |
| 6,296,398 B1 | * | 10/2001 | Lu .................................. | 385/139 |

\* cited by examiner

*Primary Examiner*—Brian Sircus
*Assistant Examiner*—Brian S. Webb
(74) *Attorney, Agent, or Firm*—Chapin & Huang, L.L.C.; David E. Huang, Esq.

(57) ABSTRACT

The invention is directed to techniques for controlling access to an optical interface using a shutter that moves away (e.g., sideways) from the optical interface when exposing the optical interface. Such movement away form the optical interface avoids pushing dirt and debris toward the optical interface when the shutter exposes the optical interface to form an optical connection. Such operation keeps the optical interface clean as well as prevents light from inadvertently escaping from the optical interface that could otherwise cause eye injury (e.g., due to the light intensity). One arrangement is directed to an optical connection system having a first optical connector and a second optical connector. The first optical connector has a connector body, an optical interface disposed within the connector body, a shutter, and a shutter controller that attaches the shutter to the connector body and that permits the shutter to move between a first position that covers the optical interface and a second position that exposes the optical interface. The second optical connector has a connector body that defines an actuator. The actuator is configured to (i) move the shutter away from the optical interface such that the shutter moves from the first position that covers the optical interface to the second position that exposes the optical interface when the second optical connector connects with the first optical connector, and (ii) maintain the shutter in the second position when the second optical connector remains connected with the first optical connector. Since the shutter moves away from the optical interface rather than toward the optical interface, any dirt and debris on the shutter is drawn away from the optical interface. This operation is superior to that of the conventional hinged-cover adaptor approach in which dirt and debris on the adaptor covers is pushed into the adaptor cavity and toward the fiber end of a fiber optic connector.

32 Claims, 5 Drawing Sheets

METHODS AND APPARATUS FOR CONTROLLING ACCESS TO AN OPTICAL INTERFACE

BACKGROUND OF THE INVENTION

A typical fiber optic cable includes a fiber optic connector at each end. Each fiber optic connector typically includes a precision molded component called a ferrule (e.g., an MT ferrule) which precisely positions an end of an optical fiber of the fiber optic cable. In general, when a connector of a first fiber optic cable connects with a connector of a second fiber optic cable, an end of an optical fiber of the first fiber optic cable aligns with an end of an optical fiber of the second fiber optic cable in order to form an optical connection that is capable of conveying light from one cable to the other.

Such a connection is typically a source of light energy loss. In particular, any imperfections or small particles of dirt on the ends of the optical fibers will tend to reduce the amount of the light energy that passes from one cable to the other. As the amount of imperfections (e.g., scratches) and dirt increases at the optical fiber ends, less and less light energy passes from one cable to the other. In extreme situations, the amount of light energy loss is so great that light detection circuitry at the end of the fiber optic pathway is no longer able to detect the light signal.

Some fiber optic connectors connect to each other through an adaptor (i.e., a coupling) which aligns and holds the connectors together. One type of adaptor (hereinafter called a hinged-cover adaptor) includes hinged covers for protecting fiber ends within the fiber optic connectors. The hinged-cover adaptor works as follows.

Initially, a first fiber optic connector inserts into an opening at one end of the hinged-cover adaptor. The opening leads to an adaptor cavity within the adaptor. As the first fiber optic connector inserts into the opening, the first fiber optic connector pushes against a hinged cover that covers the opening. In response, the hinged cover swings open toward the center of the adaptor cavity, and the hinged-cover adaptor fits over and attaches to the first fiber optic connector. The hinged cover remains open toward the center of the adaptor cavity while the hinged-cover adaptor remains attached to the first fiber optic connector.

At this time, a second hinged cover at the opposite end of the hinged-cover adaptor covers the first fiber optic connector. Accordingly, if the first fiber optic connector is active (i.e., if pulses of light emanate from the fiber optic connector), the pulses of light will strike the second hinged cover at the opposite end of the hinged-cover adaptor rather than escape from the hinged-cover adaptor and possibly cause eye injury.

Next, a second fiber optic connector inserts into an opening at the opposite end of the hinged-cover adaptor. As the second fiber optic connector inserts into the opening, the second fiber optic connector pushes against the second hinged cover which covers the opening. In response, the second hinged cover swings toward the center of the adaptor cavity and toward the first fiber optic connector. The hinged-cover adaptor eventually fits over and attaches to the second fiber optic connector such that the ends of the first and second fiber optic connectors contact each other to form a fiber optic connection. As with the first hinged cover, the second hinged cover remains open while the hinged-cover adaptor remains attached to the second fiber optic connector.

SUMMARY OF THE INVENTION

Unfortunately, there are deficiencies with the above-described conventional approach to connecting two fiber optic connectors using a hinged-cover adaptor. In particular, when the hinged-cover adaptor is fitted over and attached to a first fiber optic connector and a second fiber optic connector subsequently inserts into the hinged-cover adaptor to form a fiber optic connection with the first fiber optic connector, the second fiber optic connector pushes a hinged-cover toward the first fiber optic connector. Any dirt or debris (e.g., dust) residing on the hinged-cover gets pushed into the adaptor cavity and onto the fiber end of the first fiber optic connector. Accordingly, the fiber optic connection formed between the first and second fiber optic connectors is prone to light energy loss due to the introduction of dirt and debris. Moreover, such dirt and debris tends to collect within the adaptor cavity (e.g., becomes held within the adaptor cavity by the hinged covers) over time increasing the likelihood of forming an unreliable fiber optic connection the more often connectors are inserted, removed and reinserted. In extreme situations, the dirt and debris accumulates to the point that it blocks the light signal between the fiber optic connectors thus destroying the fiber optic connection.

In contrast to the above-identified conventional approach to connecting fiber optic connectors using a hinged-cover adaptor, the invention is directed to techniques for controlling access to an optical interface using a shutter that moves away from the optical interface when exposing the optical interface. Such movement away from the optical interface avoids pushing dirt and debris toward the optical interface when the shutter exposes the optical interface to form an optical connection. Such operation keeps the optical interface clean as well as prevents light from inadvertently escaping from the optical interface that could otherwise cause eye injury (e.g., due to the light intensity).

One arrangement is directed to an optical connection system having a first optical connector and a second optical connector. The first optical connector has a connector body, an optical interface disposed within the connector body, a shutter, and a shutter controller that attaches the shutter to the connector body and that permits the shutter to move between a first position that covers the optical interface and a second position that exposes the optical interface. The second optical connector has a connector body that defines an actuator. The actuator is configured to (i) move the shutter away from the optical interface such that the shutter moves from the first position that covers the optical interface to the second position that exposes the optical interface when the second optical connector connects with the first optical connector, and (ii) maintain the shutter in the second position when the second optical connector remains connected with the first optical connector. Since the shutter moves away from the optical interface rather than toward the optical interface, any dirt and debris on the shutter is drawn away from the optical interface. This operation is superior to that of the conventional hinged-cover adaptor approach in which dirt and debris on the adaptor covers is pushed into the adaptor cavity and toward the fiber end of a fiber optic connector. Additionally, the shutter covers the optical interface to provide eye safety in situations where the optical interface is active (e.g., when the optical interface is an end of a fiber optic cable which is transmitting a signal), even when the optical connectors are disconnected from each other.

In one arrangement, the optical interface of the first optical connector includes a portion of an optical fiber having a center axis. In this arrangement, the shutter controller is configured to allow the shutter to move in a direction that is substantially perpendicular to the center axis of the portion of the optical fiber. In particular, the shutter defines a surface that extends along a plane, and the shutter controller is configured to allow the shutter to move in a direction that is substantially parallel with the plane. Such movement of the shutter is essentially sideways relative to the optical interface thus allowing the first and second optical connectors to engage each other unhindered by the shutter.

In one arrangement, the shutter controller has spring portions that compress when the shutter moves from the first position to the second position. The spring portions compress in order to push the shutter back over the optical interface in the event that the first and second optical connectors disconnect from each other. Preferably, the shutter and the shutter controller form a single contiguous member (e.g., plastic, metal, etc.) in order to form a simple, low cost component.

In one arrangement, the shutter controller is configured to lift at least an edge of the shutter away from the optical interface as the shutter slides sideways relative to the optical interface such that the shutter is free of contact with the optical interface. Accordingly, the shutter does not scratch or scuff the optical interface (i.e., does not create imperfections on the optical interface that would act as a source of light energy loss) as it moves to expose the optical interface to form an optical connection.

The features of the invention, as described above, may be employed in fiber optic connection systems, devices and methods such as those of Teradyne, Inc. of Boston, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for controlling access to an optical interface using a shutter that moves away from the optical interface when exposing the optical interface. Such movement away from the optical interface avoids pushing dirt and debris toward the optical interface when the shutter exposes the optical interface to form an optical connection (e.g., with another optical interface). Such operation keeps the optical interface clean as well as prevents light from inadvertently escaping from the optical interface that could otherwise cause eye injury to someone in the vicinity of the optical interface (e.g., due to the light energy intensity).

Figure 1A:
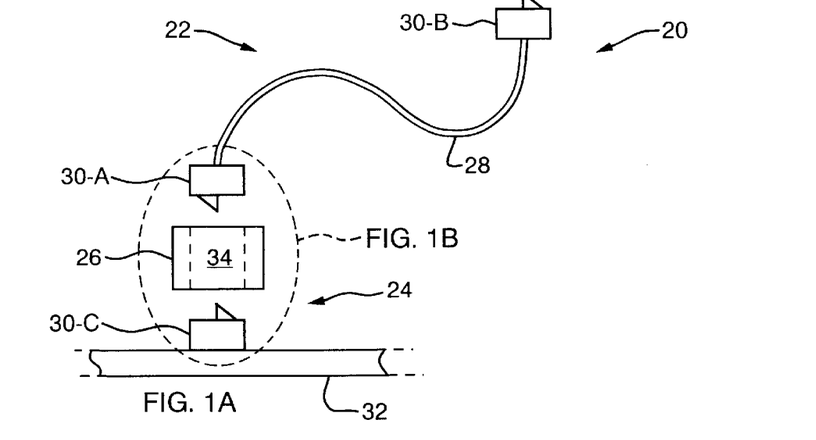
FIG. 1 is a diagram of a fiber optic connection system, which is suitable for use by the invention, including a perspective view of a pair of fiber optic connectors which are capable of connecting with each other.
Figure 1B:
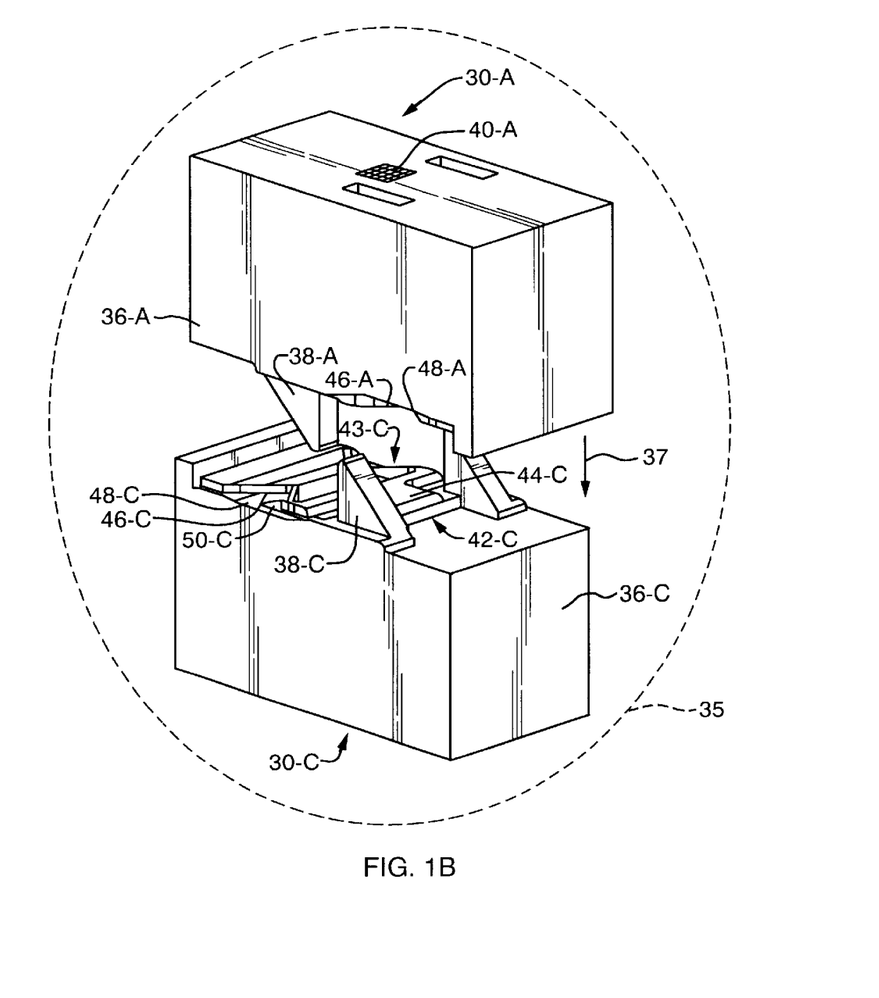

FIG. 1 shows a fiber optic connection system 20 which is suitable for use by the invention. The connection system 20 includes a fiber optic cable 22, a circuit board 24 and an adaptor (or coupling) 26. The fiber optic cable 22 includes a portion 28 of fiber optic cable, a first fiber optic connector 30-A disposed at one end of the fiber optic cable portion 28, and a second fiber optic connector 30-B disposed at the other end of the fiber optic cable portion 28. The circuit board 24 includes, among other things, a section of circuit board material 32, and a fiber optic connector 30-C. The adaptor 26 has a housing that defines an adaptor cavity 34.

In general, to connect the fiber optic cable 22 to the circuit board 24 using the adaptor 26, a user inserts the connector 30-C into an opening of the adaptor 26 such that the connector 30-C resides in a portion of the adaptor cavity 34. Then, the user inserts the connector 30-A into an opposite opening of the adaptor 26 until the connectors 30-A, 30-C connect with each other. The adaptor 26 then retains the connectors 30-A, 30-C together within the adaptor cavity 34 (e.g., latches the connectors 30-A, 30-C together).

FIG. 1 further shows a detailed view 35 of the connectors 30-A, 30-C. The connectors 30-A, 30-C are oriented such that they will connect with each other when brought together (e.g., when the connector 30-A moves in the direction 37). Although the adaptor 26 is preferably present when the connectors 30-A, 30-C connect with each other, the adaptor 26 is omitted from the view 35 to better show the details of the connectors 30-A, 30-C. As shown, each of the connectors 30-A, 30-C includes a connector body 36 that defines a set of actuators 38, a set of fiber optic cable ends 40 (i.e., one or more fiber optic cable ends), an optical interface 42 (i.e., the surfaces of the fiber optic cable ends which are covered in FIG. 1), and a shutter member 43.

Each shutter member 43 includes a shutter 44 and a set of spring portions 46. The set of spring portions 46 attaches the shutter 44 to the connector body 36 and operates as a shutter controller for controlling movement of the shutter 44 relative to the connector body 36. The shutters 44 control access to the optical interfaces 42 of the connectors 30. For example, the shutter 44-C covers the optical interface 42-C of the connector 30-C when the shutter 44-C is in a first position (e.g., unconnected with another connector as shown in FIG. 1), and exposes the optical interface 42-C when the shutter 44-C is in a second position (e.g., connected with another connector). Accordingly, the shutters 44 prevent dirt and debris from contaminating the optical interfaces 42 which would result in light energy loss. Furthermore, if the optical interfaces 42 are active (e.g., if the circuit board 24 is active such that pulses of light escape from the optical interface 42-C of the connector 42-C), the shutters 44 prevent eye injury to those in the vicinity (e.g., the shutter 44-C of the connector 42-C prevents light pulses from the optical interface 42-C injuring any bystanders).

As shown in FIG. 1, each connector body 36 further defines a pocket 48 and a set of holes 50. When the connectors 30-A, 30-C are brought together, the actuators 38-C of the connector 30-C compress the spring portions 46-A of the shutter member 43-A, and the actuators 38-A of the connector 30-A compress the spring portions 46-C of the shutter member 43-C. As the spring portions 46-A compress, the shutter member 43-A preferably buckles toward the connector body 36-A in the direction of the pocket 48-A thus lifting the shutter 44-A out of contact with the optical interface 42-A. Similarly, as the spring portions 46-C compress, the shutter member 43-C preferably buckles toward the connector body 36-C in the direction of the pocket 48-C thus lifting the shutter 44-C out of contact with the optical interface 42-C. The set of holes 50-C in the connector body 36-C receive the actuators 38-A, and the set of holes 50-A in the connector body 50-A receive the actuators 38-C, in order to stabilize and properly align the connector bodies 36-A, 36-C relative to each other.

It should be understood that the spring portions 46 decompress when the connectors 30-A, 30-C disconnect from each other. During disconnection, the spring portions 46 push the shutters 44 back over the optical interfaces 42. Accordingly, any light emanating from the optical interfaces 42 when the connections 30-A, 30-C have been disconnected, and removed from the adaptor 26, will be blocked by the shutters 44 to prevent bystanders from suffering eye injury. Since the shutters 44 are attached to the connector bodies 36 of the connectors 30, the shutters 44 provide a reliable mechanism against eye injury due to escaping fiber optic light. This mechanism is superior to the conventional hinged-cover adaptor approach which provides eye protection only when the ends of the conventional fiber optic connectors are inserted within a conventional hinged-cover adaptor, since conventional fiber optic connectors which are removed from the conventional hinged-cover adaptors have no other eye protection feature to block escaping light.

In one arrangement, the connectors 30 have identical shapes, and the connectors 30 connect with each other when oriented in a reverse manner (as shown in the view 35 of FIG. 1). This situation enables the connectors 30-A, 30-B, 30-C to be manufactured from a single connector design and thus lower the cost and complexity of the connectors 30. Further details of the invention will now be provided with reference to FIGS. 2A, 2B, 2C and 2D.

Figure 2A:
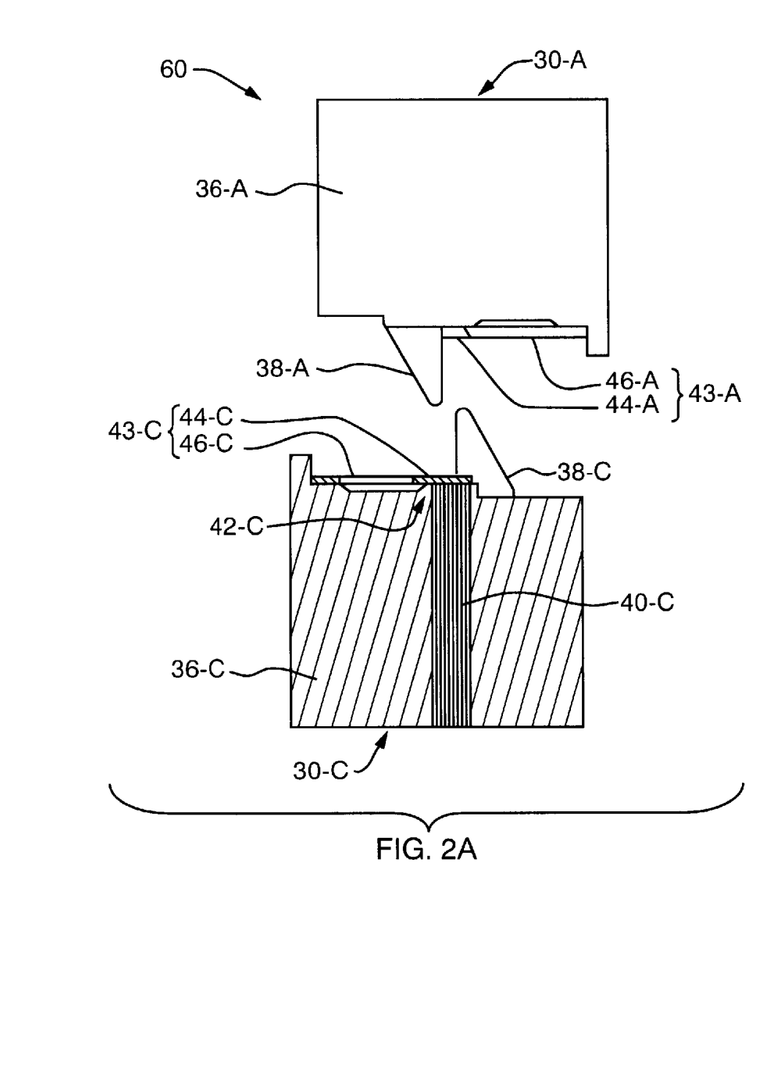
FIG. 2A is a side view of the pair of fiber optic connectors of FIG. 1 when the fiber optic connectors are unconnected with each other.

FIG. 2A shows a side view 60 of the fiber optic connectors 30-A, 30-C when the connectors 30-A, 30-C are unconnected with each other and have the same orientation as in FIG. 1. Here, the set of actuators 38-A of the connector 30-A are out of contact with the shutter member 43-C of the connector 30-C, and the set of actuators 38-C of the connector 30-C are out of contact with the shutter member 43-A of the connector 30-A. Accordingly, the spring portions 46-A of the shutter member 43-A position the shutter 44-A of the connector 30-A such that it covers the optical interface 42-A, and the spring portions 46-C of the shutter member 43-C position the shutter 44-C such that it covers the optical interface 42-C.

Figure 2B:
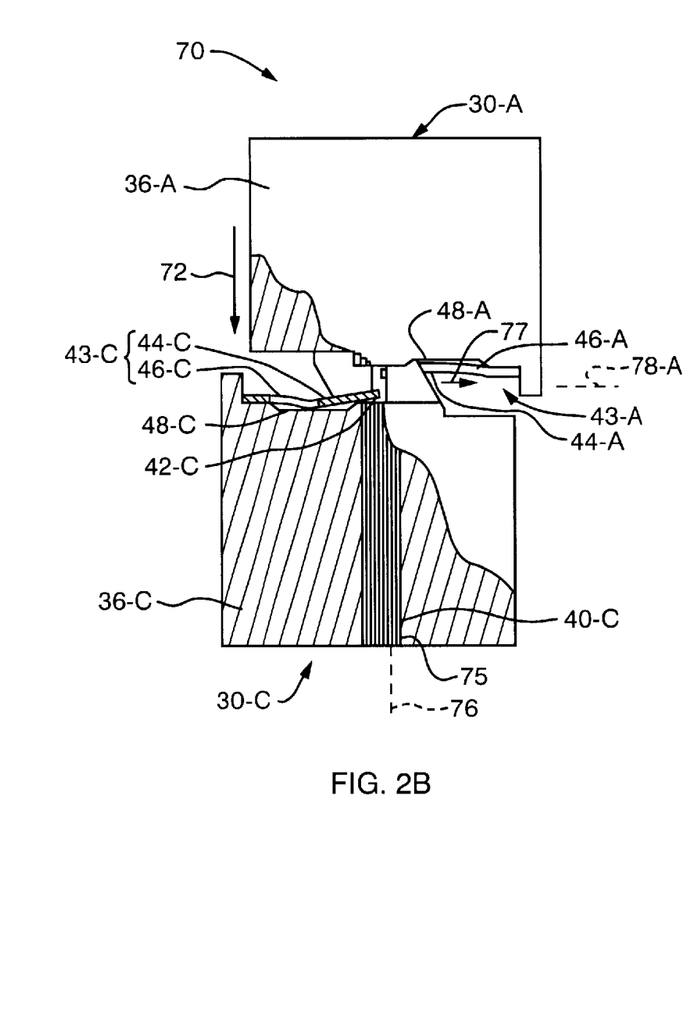
FIG. 2B is a side view of the pair of fiber optic connectors of FIG. 1 when the fiber optic connectors begin connecting with each other.

FIG. 2B shows a side view 70 of the fiber optic connectors 30-A, 30-C when the fiber optic connector 30-A is moved in a direction 72 toward to the connector 30-C. As shown, the connectors 30-A, 30-C contact each other. In particular, the set of actuators 38-A of the connector 30-A contacts the shutter member 43-C of the connector 30-C, and the set of actuators 38-C of the connector 30-C contacts the shutter member 43-A of the connector 30-A. When the set of actuators 38-C pushes against the shutter member 43-A of the connector 30-A, the spring members 46-A of the shutter member 43-A compress and the shutter 44-A moves away from the optical interface 42-A to partially expose the optical interface 42-A. Similarly, when the set of actuators 38-A pushes against the shutter member 43-C of the connector 30-C, the spring members 46-C of the shutter member 43-C compress and the shutter 44-C moves away from the optical interface 42-C to partially expose the optical interface 42-C. As the connectors 30-A, 30-C connect with each other, the set of actuators 38-A insert into the holes 50-C of the connector 30-C, and the set of actuators 38-C insert into the holes 50-A of the connector 30-A (also see FIG. 1).

It should be understood that each connector 30 has an optical interface 42 which includes one or more optical fiber portions 75, and that each optical fiber portion 75 has a center axis 76 that extends along the direction 72. It should be further understood that the shutters 44 move away from the optical fiber portions 75 of the optical interfaces 42 in a sideways manner. That is, the motions of the shutters 44 include a substantial transverse component which enables the shutters 44 to move in a direction (see arrow 77 in FIG. 2b) that is substantially perpendicular to the center axes 76. As will be described in more detail below, the motions of the shutters 44 further include a rotational component that enables the shutters 44 to lift away from the optical interfaces 42 to avoid scratching the optical interfaces 42.

In one arrangement, the shutters 44 move substantially sideways along a plane 78 that is substantially perpendicular to the center axes 76. For example, the surface of the shutter 44-C defines a plane 78-C which is substantially perpendicular to the center axes 76, and the shutter 44-C moves along that plane 78-C away from the optical interface 42-C. Preferably, the shutter motion includes a rotational component that allows the shutter 44-C to lift away from the optical interface 42-C to avoid scratching the optical interface 42-C. Accordingly, any dirt and debris on the shutter 44-C is guided away from the optical interface 42-C rather than toward it. Furthermore, since the connectors 30-A, 30-C are in the process of connecting, there is little opportunity for dirt or debris to suddenly enter the connecting area and contaminate the optical interfaces 42-A, 42-C.

Preferably, as the spring portions 46-A compress, the shutter member 43-A buckles toward the pocket 48-A, and the shutter 44-A lifts away from the optical interface 42-A to avoid contacting (e.g., to avoid scratching or scuffing) the optical interface 42-A. Similarly, as the spring portions 46-C compress, the shutter member 43-C preferably buckles toward the pocket 48-C, and the shutter 44-C lifts away from the optical interface 42-C to avoid contacting the optical interface 42-C.

Figure 2C:
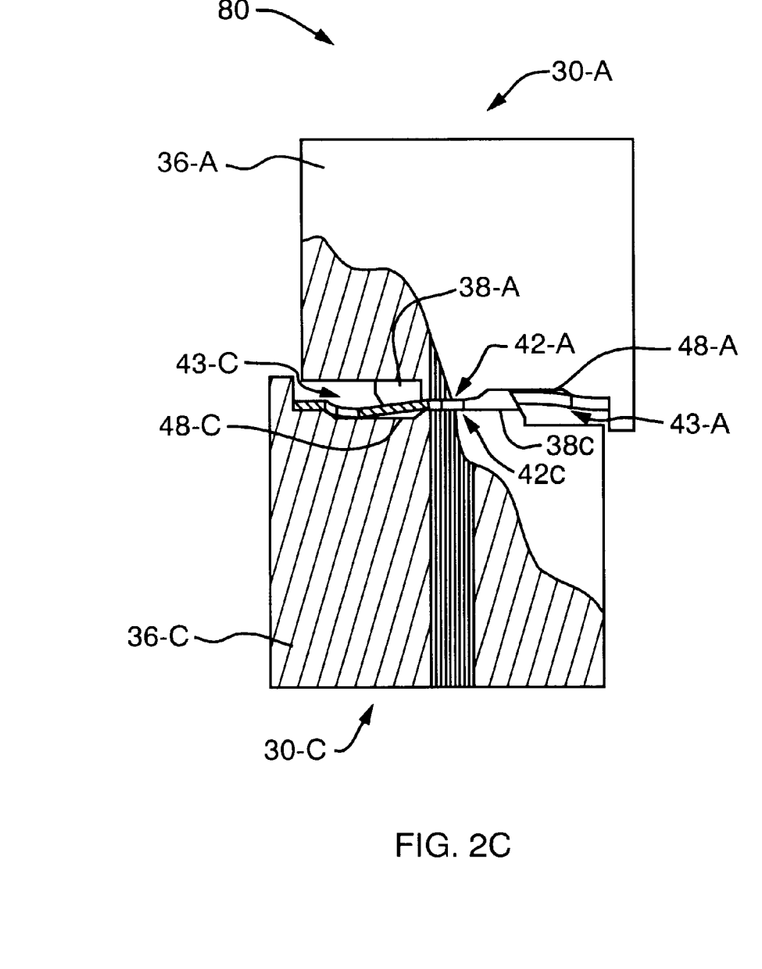
FIG. 2C is a side view of the pair of fiber optic connectors of FIG. 1 when the fiber optic connectors are almost completely connected with each other.

FIG. 2C shows a side view 80 of the fiber optic connectors 30-A, 30-C when the connectors 30-A, 30-C are almost completely connected with each other. Here, the set of actuators 38-C pushes against the shutter member 43-A of the connector 30-A to fully expose the optical interface 42-A, and the set of actuators 38-A pushes against the shutter member 43-C of the connector 30-C to fully expose the optical interface 42-C. Although the optical interfaces 42-A, 42-C are not in contact with each other at this point, they are very closely aligned with each other.

Figure 2D:
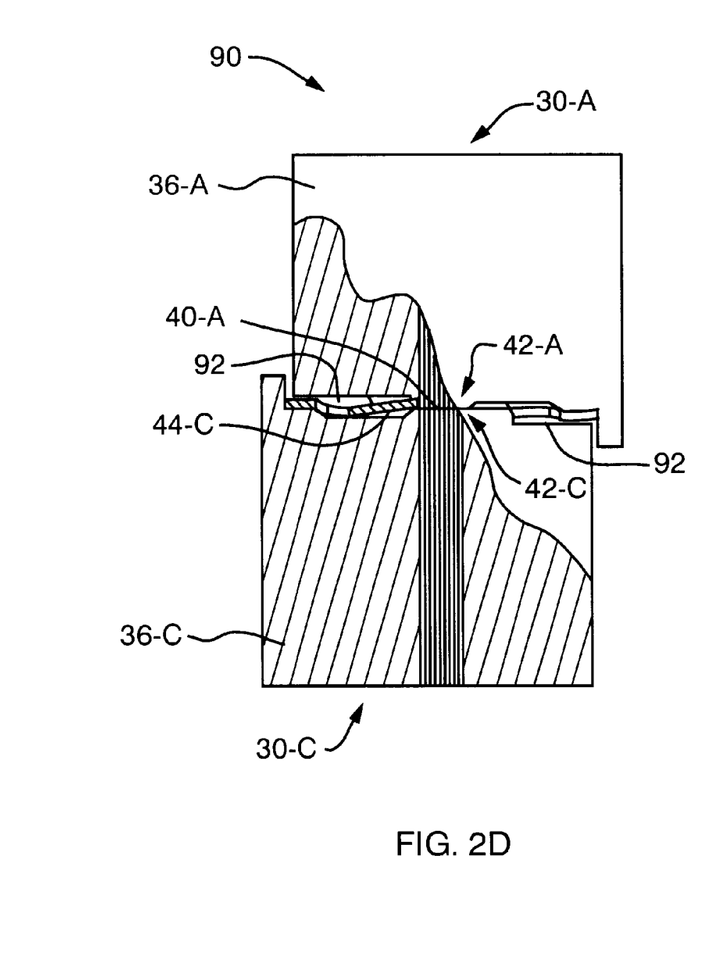
FIG. 2D is a side view of the pair of fiber optic connectors of FIG. 1 when the fiber optic connectors are completely connected with each other.

FIG. 2D shows a side view 90 of the fiber optic connectors 30-A, 30-C when the connectors 30-A, 30-C are fully connected with each other. Here, the optical interfaces 42-A, 42-C are in contact with each other, and are precisely aligned with each other to form one or more optical connections depending on the number of fiber ends in the optical interfaces 42-A, 42-C. At this point, the set of actuators 38-A are fully inserted into the holes 50-C of the connector 30-C, and the set of actuators 38-C are fully inserted into the holes 50-A of the connector 30-A. Additionally, the shutter members 43-A, 43-C are fully compressed and fitted into recessed spaces 92 between the connectors 30-A, 30-C. Furthermore, although the adaptor 26 is not shown in FIGS. 2A, 2B, 2C and 2D for simplicity, it should be understood that the connectors 30-A, 30-C are held together by the adaptor 26 (see FIG. 1). Further details of the invention will now be provided with reference to FIG. 3.

Figure 3:
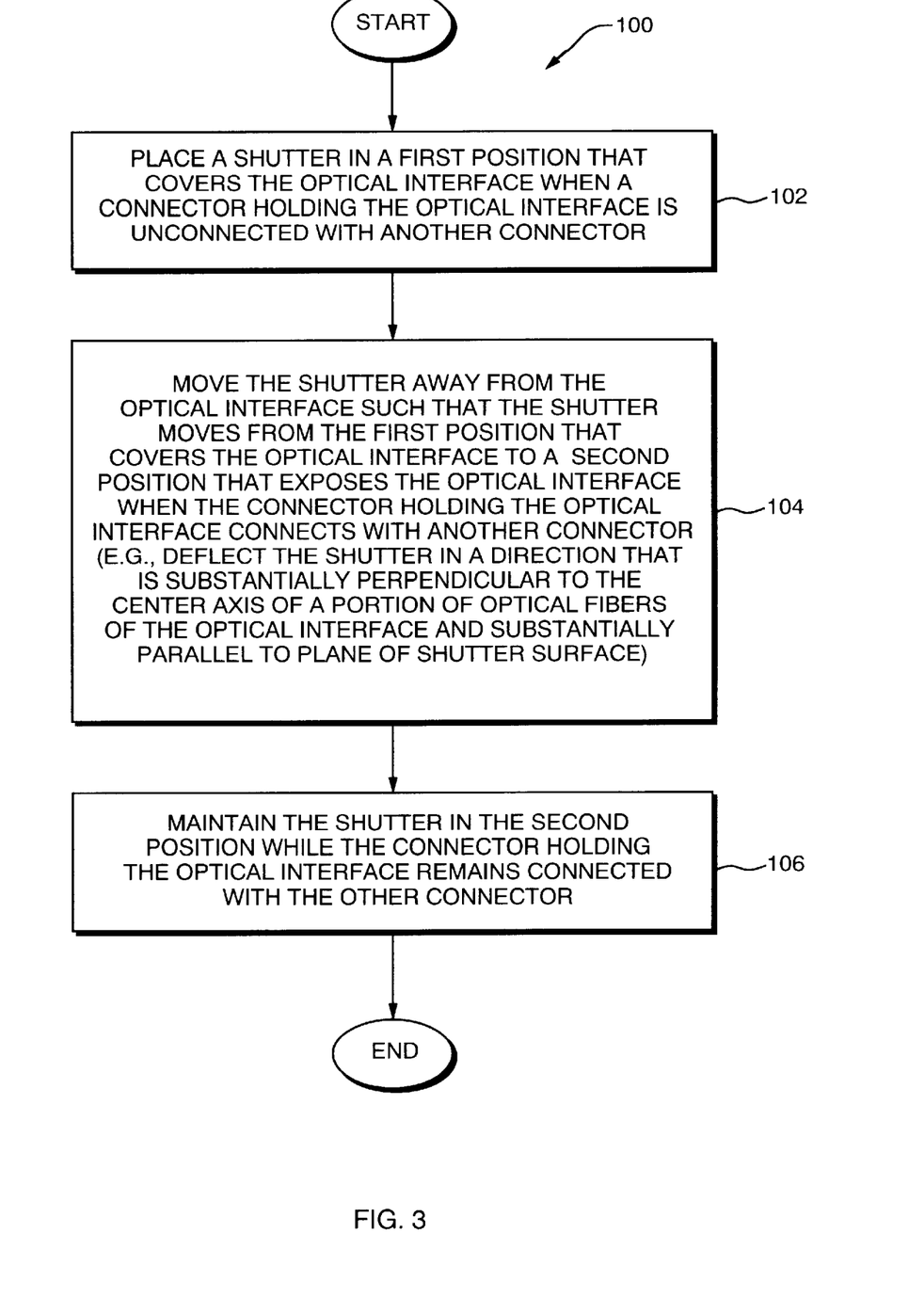
FIG. 3 is a flow diagram of a procedure for connecting the fiber optic connectors of FIG. 1.

FIG. 3 shows a flow diagram of a procedure 100 for controlling access to an optical interface. The procedure 100 will be explained with reference to the optical interface 42-C of the fiber optic connector 30-C of FIGS. 1, 2A, 2B, 2C and 2D.

In step 102, the shutter 44-C is initially placed in a first position that covers the optical interface 42-A when the connector 30-C holding the optical interface 42-C is unconnected with the connector 30-A. In particular, the spring portions 46-C of the shutter member 43-C push the shutter 44-C into the first position that covers the optical interface 42-C (see FIG. 2A).

In step 104, as the connectors 30-A, 30-C connect with each other, the set of actuators 38-A move the shutter 44-C away from the optical interface 42-C such that the shutter 44-C moves from the first position that covers the optical interface 42-C to a second position that exposes the optical interface 42-C. As shown in FIGS. 2A, 2B, 2C and 2D, the set of actuators 38-A deflects the shutter 42-C in a direction 77 that is substantially perpendicular to the center axis 76 of an optical fiber portion of the optical interface 42-C and substantially parallel to the plane 78 of the shutter surface.

In step 106, while the connectors 30-A, 30-C remain connected with each other, the shutter 44-C remains in the second position that exposes the optical interface 42-C. In particular, as shown in FIG. 2D, the shutter 44-C remains in a recessed space 92 between the connectors 30-A, 30-C such that the optical interface 42-C remains fully exposed.

It should be understood that the shutter members 43 of the connectors 30 were described above as sliding substantially sideways relative to the optical interfaces 42 due to the operation of spring portions 46, by way of example only. Other mechanisms are suitable for use by the invention as well. An alternative shutter mechanism will now be described with reference to FIGS. 4A and 4B.

Figure 4A:
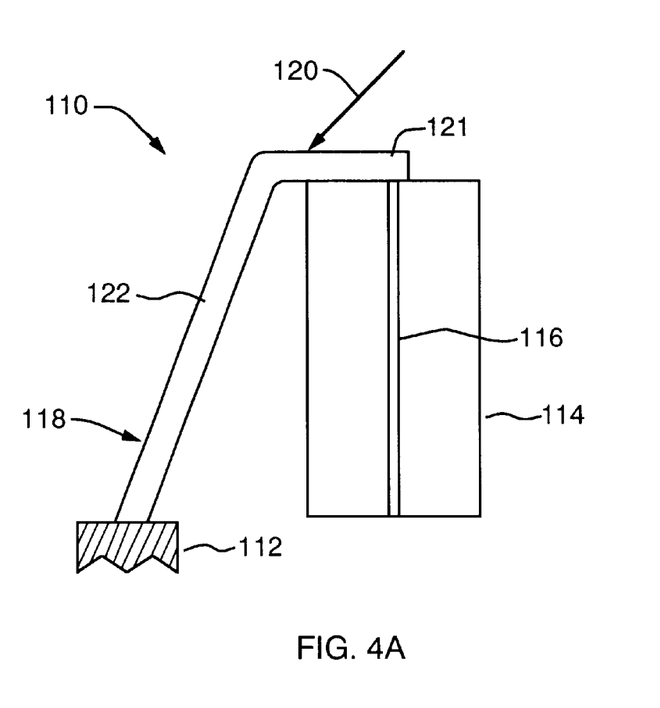
FIG. 4A is a side view of an alternative arrangement for a shutter member of the connection system of FIG. 1.

FIG. 4A shows a side view 110 of a portion of an alternative connector body 112 for the connectors 30 of FIG. 1. The connector body 112 includes a ferrule 114 which holds a single optical fiber portion 116 (by way of example only), and a shutter member 118 that fastens to the connector body 112. The shutter member 118 includes a shutter 121 and an intermediate portion 122.

Figure 4B:
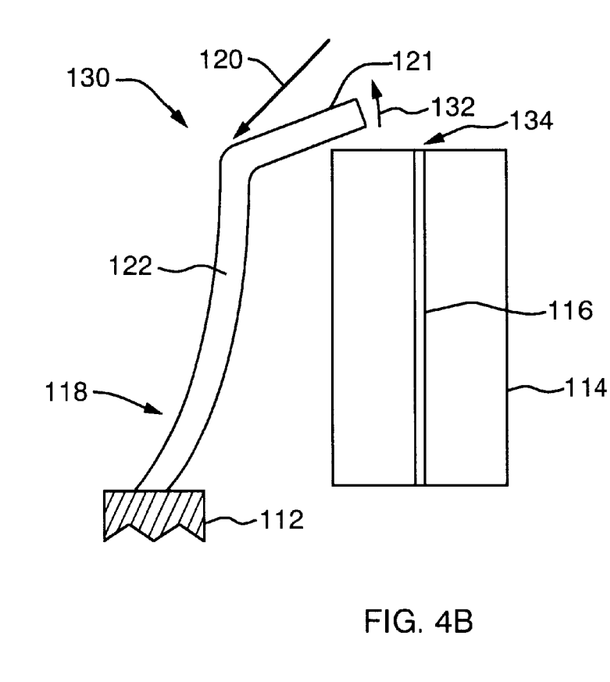
FIG. 4B is a side view of the alternative arrangement of FIG. 4A with the shutter member in a different position.

As shown in a side view 130 in FIG. 4B, when an actuator 38 (also see FIG. 1) of another connector 30 pushes against the shutter member 118 (see arrow 120), the intermediate portion 122 operates as a shutter controller to control movement of the shutter 121. In particular, the intermediate portion 122 bends in an arching manner (see arrow 132) to move the shutter 121 away from the optical interface 134 formed by the end of the optical fiber portion 116. The movement of the shutter 121 includes a rotational component so that the shutter 121 lifts up and away from the optical interface 134 to avoid contact with the optical interface 134. Accordingly, any dirt and debris on the shutter 121 is moved in a direction away from the optical interface 134 rather than toward it.

As described above, the invention is directed to techniques for controlling access to an optical interface 42 using a shutter 44, 121 that moves away from the optical interface 42 (e.g., sideways) when exposing the optical interface 42. Such movement away from the optical interface 42 avoids pushing dirt and debris toward the optical interface 42 when the shutter 44, 121 exposes the optical interface 42 to form an optical connection (e.g., with another optical interface 42). Accordingly, such operation keeps the optical interface 42 clean as well as prevents light from inadvertently escaping from the optical interface 42 that could otherwise cause eye injury to someone in the vicinity of the optical interface 42 (e.g., due to the light energy intensity).

Since the shutter 44, 121 is attached to the connector body 36, 112, the shutter 44, 121 covers the optical interface 42 whenever the connector 30 is disconnected from another connector 30 to prevent eye injury due to escaping light if the optical interface 42 is active. Such eye protection is provided in an automated and consistent manner even when the connectors 30 are disconnected and removed from the adaptor 26, as compared to the conventional hinged-cover adaptor approach which provides no eye protection once the conventional connectors are removed from the conventional hinged-cover adaptor.

The features of the invention, as described above, may be employed in connection systems, and computer related fiber optic devices and methods such as those of Teradyne, Inc. of Boston, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the fiber optic connection system 20 of FIG. 1 was described as including a fiber optic cable 22 and a circuit board 24 by way of example only. In other arrangements, the connection system 20 includes two circuit boards (e.g., a main circuit board and a daughter card, a circuit board and a backplane, etc.), or two cables, and so on.

Additionally, it should be understood that when the connection system 20 includes the circuit board 24, the circuit board 24 can include a variety of other components. For example, the fiber optic connector 30-C can mount to a transducer (e.g., a device that converts between electrical and optical signals) which is mounted to the circuit board section 32 rather than mount to the circuit board 24 itself as shown in FIG. 1.

Furthermore, it should be understood that the optical fibers of the fiber optic connectors 30 can be relatively short. For example, for the fiber optic connector 30 that mounts on the circuit board 24 or circuit board component, the optical fibers can be as short as the height of the connector 30.

Additionally, it should be understood that the connectors 30 can include latching or detention mechanisms which enable the connectors 30 to connect with each other without the need for the adaptor 26. Such modifications are intended to be within the scope of the invention.

What is claimed is:

1. An optical connection system, comprising:
   a first optical connector having:
      a connector body which defines an alignment hole and a connector body surface,
      an optical interface disposed within the connector body, and having an end which is substantially flush with the connector body surface defined by the connector body, the connector body surface and the end of the optical interface forming a substantially planar interface surface, a shutter,
and a shutter controller that attaches the shutter to the connector body and that permits the shutter to move between a first position that covers the substantially planar interface surface formed by the connector body surface and the end of the optical interface and a second position that exposes the substantially planar interface surface formed by the connector body surface and the end of the optical interface; and a second optical connector having a connector body that defines an actuator, and a corresponding substantially planar interface surface which is configured to contact the substantially planar interface surface formed by the connector body surface and the end of the optical interface, wherein the actuator is configured to move the shutter away from the optical interface such that the shutter moves from the first position to the second position when the second optical connector connects with the first optical connector, and wherein the connector body of the first optical connector defines the alignment hole such that the alignment hole receives the actuator when the actuator moves the shutter from the first position to the second position.

2. The connection system of claim 1 wherein the optical interface of the first optical connector includes a portion of an optical fiber having a center axis, and wherein the shutter controller is configured to allow the shutter to move in a direction that is substantially perpendicular to the center axis of the portion of the optical fiber.

3. The connection system of claim 2 wherein the shutter defines a surface that extends along a plane, and wherein the shutter controller is configured to allow the shutter to move in a direction that is substantially parallel with the plane.

4. The connection system of claim 1 wherein the shutter controller has spring portions that compress when the shutter moves from the first position to the second position.

5. The connection system of claim 4 wherein the shutter and the shutter controller having the spring portions form a single contiguous member.

6. The connection system of claim 1 wherein the shutter controller is configured to compress such that the shutter slides substantially sideways relative to the optical interface, and wherein the shutter controller is configured to lift at least an edge of the shutter away from the optical interface as the shutter slides sideways relative to the optical interface such that the shutter is free of contact with the optical interface.

7. The optical connection system of claim 1 wherein the second optical connector further includes an optical interface and a shutter which is configured to move relative to the optical interface of the second optical connector, and wherein the actuator defined by the connector body of the second optical connector is configured to remain in a substantially fixed position relative to optical interface of the second optical connector.

8. The optical connection system of claim 1 wherein the connector body of the first optical connector further defines a pocket into which at least a portion of the shutter and the shutter controller enter when the actuator defined by the connector body of the second optical connector moves the shutter from the first position to the second position.

9. An optical connector, comprising:
a connector body which defines an alignment hole and a connector body surface;
an optical interface disposed within the connector body, and having an end which is substantially flush with the connector body surface defined by the connector body, the connector body surface and the end of the optical interface forming a substantially planar interface surface;

a shutter; and
a shutter controller that attaches the shutter to the connector body and that permits the shutter to move between a first position that covers the substantially planar interface surface formed by the connector body surface and the end of the optical interface and a second position that exposes the substantially planar interface surface formed by the connector body surface and the end of the optical interface, wherein the shutter controller is configured to move the shutter away from the optical interface such that the shutter moves from the first position to the second position when the optical connector connects with another optical connector having (i) an actuator which contacts the shutter to move the shutter between the first position and the second position and (ii) a corresponding substantially planar interface surface which is configured to contact the substantially planar interface surface formed by the connector body surface and the end of the optical interface, and wherein the connector body defines the alignment hole such that the alignment hole receives the actuator when the actuator contacts the shutter to move the shutter between the first position and the second position.

10. The optical connector of claim 9 wherein the optical interface includes a portion of an optical fiber having a center axis, and wherein the shutter controller is configured to allow the shutter to move in a direction that is substantially perpendicular to the center axis of the portion of the optical fiber.

11. The optical connector of claim 10 wherein the shutter defines a surface that extends along a plane, and wherein the shutter controller is configured to allow the shutter to move in a direction that is substantially parallel with the plane.

12. The optical connector of claim 9 wherein the shutter controller has spring portions that compress when the shutter moves from the first position to the second position.

13. The optical connector of claim 12 wherein the shutter and the shutter controller having the spring portions form a single contiguous member.

14. The optical connector of claim 9 wherein the shutter controller is configured to compress such that the shutter slides substantially sideways relative to the optical interface, and wherein the shutter controller is configured to lift at least an edge of the shutter away from the optical interface as the shutter slides sideways relative to the optical interface such that the shutter is free of contact with the optical interface.

15. The optical connector of claim 9 wherein the connector body further defines a set of actuators which is configured to move a shutter of the other optical connector, and wherein each of the set of actuators defined by the connector body is configured to remain in a substantially fixed position relative to the optical interface disposed within the connector body.

16. The optical connector of claim 9 wherein the connector body further defines a pocket into which at least a portion of the shutter and the shutter controller enter when the actuator of the other optical connector moves the shutter from the first position to the second position.

17. An optical cable, comprising:
an optical cable portion;
a first optical connector attached to a first end of the optical cable portion; and
a second optical connector which includes:
a connector body attached to a second end of the optical cable portion, the connector body defining (i) an alignment hole, and (ii) a connector body surface which is substantially flush with an optical fiber end of the second end of the optical cable portion to form a substantially planar interface surface, a shutter, and a shutter controller that attaches the shutter to the connector body and that permits the shutter to move between a first position that covers the optical fiber end of the second end of the optical cable portion and a second position that exposes the optical fiber end, wherein the shutter controller is configured to move the shutter away from the optical fiber end such that the shutter moves from the first position that covers the optical fiber end to the second position that exposes the optical fiber end when the second optical connector connects with another optical connector having (i) an actuator, and (ii) a corresponding substantially planar interface surface which is configured to contact the substantially planar interface surface formed by the connector body surface which is substantially flush with the optical fiber end of the second end of the optical cable portion, and wherein the connector body of the second optical connector defines the alignment hole such that the alignment hole receives the actuator when the actuator moves the shutter from the first position to the second position.

18. The optical cable of claim 17 wherein the optical fiber end has a center axis, and wherein the shutter controller is configured to allow the shutter to move in a direction that is substantially perpendicular to the center axis of the optical fiber end.

19. The optical cable of claim 17 wherein the shutter controller has spring portions that compress when the shutter moves from the first position to the second position; and wherein the shutter and the shutter controller having the spring portions form a single contiguous member.

20. The optical cable of claim 17 wherein the connector body of the second optical connector further defines a set of actuators which is configured to move a shutter of the other optical connector, and wherein each of the set of actuators defined by the connector body of the second optical connector is configured to remain in a substantially fixed position relative to the optical fiber end of the second end of the optical cable portion.

21. The optical cable of claim 17 wherein the connector body of the second optical connector further defines a pocket into which at least a portion of the shutter and the shutter controller enter when the actuator of the other optical connector moves the shutter from the first position to the second position.

22. A method for controlling access to an optical interface which is substantially flush with a connector body surface defined by a connector body to form a substantially planar interface surface, the method comprising the steps of:

when a connector including the connector body and the optical interface is unconnected with another connector, placing a shutter in a first position that covers the optical interface;

when the connector including the connector body and the optical interface connects with another connector having (i) an actuator and (ii) a corresponding substantially planar interface surface which is configured to contact the substantially planar interface surface formed by the connector body surface and the optical interface, moving the actuator of the other connector (i) into an actuator hole defined by the connector body and (ii) against the shutter to move the shutter away from the optical interface such that the shutter moves from the first position that covers the optical interface to a second position that exposes the optical interface; and while the connector holding the optical interface remains connected with the other connector, maintaining the shutter in the second position.

23. The method of claim 22 wherein the optical interface includes a portion of an optical fiber having a center axis, and wherein the step of moving the shutter away from the optical interface includes the step of:

deflecting the shutter in a direction that is substantially perpendicular to the center axis of the portion of optical fiber.

24. The method of claim 23 wherein the shutter defines a surface that extends along a plane, and wherein the step of deflecting the shutter includes the step of:

moving the shutter such that the surface defined by the shutter moves in a direction that is substantially parallel with the plane.

25. The method of claim 22 wherein the step of moving the shutter away from the optical interface includes the step of:

compressing spring portions of a shutter controller that connects the shutter with a connector body of the connector holding the optical interface such that each spring portion buckles to enable the shutter to move from the first position to the second position.

26. The method of claim 22 wherein the step of moving the shutter away from the optical interface includes the steps of:

sliding the shutter sideways relative to the optical interface; and lifting at least an edge of the shutter as the shutter slides sideways relative to the optical interface such that the shutter is free of contact with the optical interface.

27. The method of claim 22 wherein the connector, which holds the optical interface, includes a set of actuators; wherein each of the set of actuators is configured to remain in a substantially fixed position relative to the optical interface; and wherein the method further comprises the step of:

disposing the set of actuators against a shutter of the other optical connector and engaging the set of actuators in a corresponding set of alignment holes defined by the other connector.

28. The method of claim 22 wherein the connector defines a pocket, and wherein the step of moving the actuator includes the step of:

receiving at least a portion of the shutter within the pocket defined by the connector when the actuator of the other optical connector moves the shutter.

29. An optical connector, comprising:

an optical interface;

a connector body which holds the optical interface, the connector body defining a set of actuator holes and a connector body surface, the connector body surface and an end of the optical interface forming a substantially planar interface surface;

a shutter which is configured to move between a first position that covers the end of the optical interface and a second position that exposes the end of the optical interface in response to contact with a set of actuators of another optical connector having a corresponding substantially planar interface surface which is configured to contact the substantially planar interface surface formed by the connector body surface and the optical interface, wherein the connector body defines the set of actuator holes such that the set of actuator holes receives the set of actuators of the other optical connector when the set of actuators contacts the shutter to move the shutter between the first and second positions.

30. The optical connector of claim 29 wherein the connector body further defines a set of actuators which is configured to move a shutter of the other optical connector, and wherein each of the set of actuators defined by the connector body is configured to remain in a substantially fixed position relative to the optical interface held within the connector body.

31. The optical connector of claim 30 wherein the shutter of the optical connector is configured to move toward the set of actuators when moving from the second position to the first position, and away from the set of actuators when moving from the first position to the second position.

32. The optical connector of claim 29 wherein the connector body further defines a pocket into which at least a portion of the shutter enters when the set of actuators of the other optical connector moves the shutter from the first position to the second position.

\* \* \* \* \*